United States Patent [19]

Wei et al.

[11] Patent Number: 4,948,538

[45] Date of Patent: Aug. 14, 1990

[54] METHOD OF MAKING TRANSLUCENT ALUMINA ARTICLES

[75] Inventors: George C. Wei, Weston; William H. Rhodes, Lexington, both of Mass.

[73] Assignee: GTE Laboratories Incorporated, Waltham, Mass.

[21] Appl. No.: 255,564

[22] Filed: Oct. 11, 1988

[51] Int. Cl.$^5$ .............................................. C04B 35/10
[52] U.S. Cl. ........................................... 264/6; 264/65
[58] Field of Search ....................................... 264/65, 6

[56] References Cited

U.S. PATENT DOCUMENTS

| | | | |
|---|---|---|---|
| 3,026,177 | 3/1962 | St Pierre et al. | 23/142 |
| 3,026,210 | 3/1962 | Coble | 106/39 |
| 3,311,482 | 3/1967 | Klingler et al. | 106/65 |
| 3,377,176 | 4/1968 | Wolkodoff et al. | 106/46 |
| 3,711,585 | 1/1973 | Muta et al. | 264/65 |
| 3,792,142 | 2/1974 | Kobayashi et al. | 264/65 |
| 3,834,915 | 9/1974 | Cleveland et al. | 106/73.4 |
| 3,905,845 | 9/1975 | Kobayashi et al. | 106/62 |
| 4,204,874 | 5/1980 | Yamada | 106/73.4 |
| 4,222,978 | 9/1980 | Oda et al. | 264/65 |
| 4,285,732 | 8/1981 | Charles et al. | 106/57 |
| 4,364,877 | 12/1982 | Clement et al. | 264/1.2 |
| 4,373,030 | 2/1983 | Kaneno et al. | 501/152 |
| 4,762,655 | 8/1988 | Rhodes et al. | 264/65 |
| 4,797,238 | 1/1989 | Rhodes et al. | 264/65 |

FOREIGN PATENT DOCUMENTS 1252851 11/1971 United Kingdom .
1443741 7/1976 United Kingdom .

OTHER PUBLICATIONS

R. L. Coble, "Sintering Alumina: Effect of Atmospheres", J. Am. Cer. Soc., vol. 45, No. 3, Mar. 1962, pp. 123-127.

*Primary Examiner*—James Derrington
*Attorney, Agent, or Firm*—Ivan L. Ericson; Frances P. Craig

[57] ABSTRACT

A method of making a translucent alumina article is described. The method comprises the following steps:

Step 1 - An alumina powder and a sintering aid are mixed in a liquid for a period sufficient to form a homogeneous slurry.

Step 2 - The homogeneous slurry from Step 1 is dried remove the liquid to form a dried powder.

Step 3 - The dried powder is shaped to form a compacted green body.

Step 4 - The compacted green body from Step 3 is heated at a temperature equal to or less than 500° C. and for a period sufficient to form a compacted green body having a density of at least 30% of theoretical density.

Step 5 - The compacted green body having a density of at least 30% of theoretical density from Step 4 is heated at a temperature from about 800° C. to about 1300° C. in an oxygen containing atmosphere for a period sufficient to impart green strength to said compacted green body to form a prefired compacted green body.

Step 6 - The prefired compacted green body from Step 5 is sintered at a temperature from about 1700° C., to about 2000° C. in an nitrogen/hydrogen atmosphere consisting essentially of nitrogen and hydrogen for a period sufficient to form a translucent polycrystalline alumina article, the hydrogen being equal to or greater than about one volume percent of said nitrogen/hydrogen atmosphere and having a dew point in the range of minus 15° C. to about minus 110° C.

20 Claims, No Drawings

METHOD OF MAKING TRANSLUCENT ALUMINA ARTICLES

FIELD OF THE INVENTION

This invention relates to a method of making an alumina article.

More particularly, this invention relates to a method of making a translucent polycrystalline alumina article.

BACKGROUND OF THE INVENTION

Conventional sintering of alumina involves hydrogen or vacuum firing. For example, U.S. Pat. No. 3,026,177 to St. Pierre et al. disclosed the production of a transparent alumina body by subjecting a compact of alumina to a first firing in hydrogen at 1650° C to 1750° C to effect removal of gas-containing pores from the body, and subjecting the body to a second firing in hydrogen at 1800° C to 2000° C for not less than 15 minutes to remove additional pores and improve the transparency of the body. The dew point of hydrogen was not stated.

U.S. Pat. No. 3,026,210 to Coble disclosed the production of a high density alumina body having substantial transparency by forming a mixture of alumina powder and a small but effective amount up to 0.5 weight percent of magnesia powder into a compact, and firing the compact at 1700° C to 1950° C in vacuum or hydrogen for 1.5 to 4 hours. The dew point of hydrogen was not stated.

The effect of atmosphere on sintering of alumina was studied by Coble, "Sintering Alumina: Effect of Atmospheres," Journal of the American Society 45 [3]123–127 (1962). It was concluded that the shrinkage rate was not affected by changing the atmosphere from minus 70° F dew point oxygen to minus 70° F hydrogen. However, whether the degree of transparency was affected or not was not stated. It was stated that alumina powder compacts containing 0.25% weight magnesia sintered to theoretical density if the ambient atmosphere was hydrogen or oxygen, but would not sinter to theoretical density in air, nitrogen, helium, or argon atmospheres.

U.S. Pat. No. 3,377,176 to Wolkodoff et al. disclosed the production of high-density alumina body by sintering an alumina compact doped with 0.1 weight percent of magnesia and yttria at 1400° C to 1550° C in hydrogen or vacuum for 4 hours. The dew point of hydrogen was not stated.

U.S. Pat. No. 3,905,845 to Kobayashi et al. disclosed the manufacturing of polycrystalline translucent alumina body by sintering an alumina compact doped with 0.05 to 0.5 weight percent of yttria, 0.05 to 0.5 weight percent of lanthana, and 0.01 to 0.1 weight percent of magnesia in vacuum or a reducing atmosphere at 1600° to 1800° C for 5 hours. The abstract said reducing atmosphere, but in all the examples cited, dry hydrogen was used, except that in one example, vacuum was used.

U.S. Pat. No. 4,285,732 to Charles et al. disclosed the production of a translucent alumina body by sintering an alumina compact doped with magnesia (0.3 to 0.15 weight percent) and an additive selected from $ZrO_2$(0.002 to 0.07 weight percent) and $HfO_2$(0.03 to 0.12 weight percent) in hydrogen at 1750° C to 1950° C for 3 hours. It was stated in this patent that the particular dew point of hydrogen was not critical, "in practice, it may range up to about 30° C, and generally dew points from about minus 10° C to about plus 20° C are utilized." The dew point of the hydrogen was measured on the downstream end of the furnace. In the examples listed in the patent, the dew points of the hydrogen used ranged from minus 30° C to plus 20° C, and the dew point of hydrogen did not appear to be particularly important.

U.S. Pat. No. 3,711,585 to Muta et al. described the use of magnesia (up to 0.1 w/o) and yttria (up to 0.25 w/o) as sintering aids for fabrication of alumina having high in-line transmittance at reduced sintering temperature and time as compared with using only magnesia as a sintering aid. The sintering atmosphere was selected from the group consisting of hydrogen and vacuum. The dew point of hydrogen was not stated.

U.S. Pat. No. 3,834,915 to J.J. Cleveland and C.W. Fritsch disclosed a translucent alumina composition, consisting of from about 99.8% to about 99.95% aluminum oxide, from about 0.025% to about 0.10% magnesium oxide, and from about 0.025% to about 0.1% of ytterbium oxide, sintered in hydrogen. The dew point of hydrogen was not stated.

U.S. Pat. No. 3,846,146 to B.J. Hunting et al. disclosed the use of magnesium oxide and calcium oxide as sintering aids for fabrication of transparent alumina in vacuum or hydrogen-containing atmospheres. However, the examples listed in the patent involved a hydrogen atmosphere of which the dew point was not stated. The "hydrogen-containing" atmosphere obviously referred to hydrogen gas.

British Pat. No. 1,443,741 to F. Puskas disclosed a cold flow technology for making shapes of translucent alumina containing a metal or metal compound comprising magnesium, cobalt, iron, calcium, nickel, molybdenum and tungsten sintered in a hydrogen gas atmosphere or in a hydrogen plasma. The dew point of hydrogen gas or plasma was not stated.

U.S. Pat. No. 4,373,030 to M. Kaneno and T. Kajihara disclosed a polycrystalline translucent alumina body doped with low level of MgO(0.01 to 0.1 w/o), $La_2O_3$(0.001 to 0.05 w/o), and $Y_2O_3$(0.001 to 0.05 w/o) and sintered under vacuum or either atmosphere of hydrogen gas ($H_2$) or dissociated ammonia gas. (75% $H_2$ and 25% $N_2$) under oxygen concentration of $10^{-15}$ to $10^{-25}$ atm. The oxygen concentration was restricted to this range because of (1) trapping of oxygen inside the pores when the oxygen concentration was greater than $10^{-15}$ atm., and (2) evaporation of $Al_{2pl}\,O_3$ in the form of lower oxides when the oxygen concentration is less than $10^{-25}$ atm., as stated in the patent.

U.S. Pat. No. 4,222,978 to I. Oda and K. Maekawa disclosed a method for producing polycrystalline translucent alumina doped with 0.01 to 0.2 w/o MgO, 0.01 to 0.2 w/o $La_2O_3$, and 0.01 to 0.2 w/o $Y_2O_3$, by a first firing under vacuum or in an atmosphere of hydrogen gas or dissociated ammonia at 1300° C to 1500° C plus a second firing at 1650° C to 1900° C for one to 15 hours with a heating rate of greater than or equal to 200° C/h for the temperature rise from 1400° C to 1700° C, to achieve an average grain size of greater than or equal to 20 $\mu$m and an average surface roughness of less than or equal to one-tenth of the maximum grain size with a high in-line transmission. However, the dew point of the hydrogen gas or dissociated ammonia gas was not stated.

U.S. Pat. No. 4,204,874 to S. Yamada disclosed a light-transmitting, polycrystalline alumina containing 0.04 to 1.5 w/o MgO and 0.2 to 3.5 w/o $Cr_2O_3$ doped with 0.1 to 1.0 w/o SrO and sintered at 1650° C in vacuum or hydrogen. The dew point of hydrogen was not stated. In example 1 of the patent, ammonia cracked gas was used. The dew point of the ammonia cracked gas was not stated.

U.S. Pat. No. 3,792,142 to K. Kobayashi et al. disclosed a method of manufacturing a polycrystalline translucent alumina doped with 0.05 to 0.5 w/o $Y_2O_3$, 0.05 to 0.5 w/o $La_2O_3$, and 0.01 to 0.1 w/o MgO and sintered at 1600° C to 1800° C in vacuum or a reducing atmosphere such as hydrogen or dissociated ammonia. It was stated in the patent that it was necessary to use a nonoxidizing atmosphere for sintering. Hydrogen gas or ammonium decomposed gas for use in sintering was subjected beforehand to a drying step in which the gas was brought into contact with an activated alumina. In fact, in the five examples listed in the patent, four involved dry hydrogen and one involved vacuum atmosphere for sintering. Ammonium decomposed gas for sintering was not evident in the examples.

British Pat. No. 1,252,851 disclosed a method of manufacturing a transparent alumina, comprising alumina added with 0.05 to 0.5 w/o $Y_2O_3$ and/or BeO, 0.05 to 0.5 w/o $La_2O_3$ and/or CaO, and 0.01 to 0.1 w/o MgO, sintered at 1600° C to 1800° C in a vacuum or in a reducing atmosphere. In the examples of the patent, dry hydrogen was used.

U.S. Pat. No. 3,311,482 disclosed transparent bodies of aluminum oxide with an average grain size of less than 10 $\mu$m doped with 0.25 w/o MgO and sintered at 1700° C to 1950° C in an atmosphere substantially free of gases having a molecular weight substantially greater than that of hydrogen. It implied that dry hydrogen was used.

U.S. Pat. No. 4,364,877 to R. Clement and F. Gugliermotte disclosed a continuous process of sintering of translucent polycrystalline alumina doped with 0.05 w/o MgO and/or rare earth oxides at 1820° C to 1970° C in a hydrogen-rich atmosphere. The atmosphere was either pure hydrogen or hydrogen to which were added "small" amounts of oxygen and/or CO and/or $N_2$ and/or water vapor. It was not clear as to how small the amounts of the added gasses were. However, it implied that wet hydrogen gas containing nitrogen would be suitable.

U.S. Pat. No. 4,762,655 to Rhodes, Wei, and Fryburg disclosed a method of sintering translucent alumina in an atmosphere containing nitrogen and an amount of hydrogen greater than or equal to about 2.5 volume percent and less than 75 volume percent for a period of time sufficient to produce a translucent polycrystalline alumina body.

DISADVANTAGES OF THE PRIOR ART

In the case of the prior art in which the dew point of hydrogen was not stated, the dew point could range from minus 100° C to plus 20° C. This covers a range of water vapor content from a few ppm to 2.3% in hydrogen. As stated in U.S. Pat. No. 4,285,732, the dew point is not critical as long as the dew point is in the range from minus 30° C to plus 20° C. This range of dew point is quite broad and is consistent with the conventional wisdom that wet hydrogen produces translucent polycrystalline alumina. It is, however, not entirely consistent with U.S. Pat. No. 4,373,030. According to the later patent, the partial pressure of oxygen in hydrogen sintering atmospheres should be kept in the range of $10^{-15}$ to $10^{-25}$ atm, which corresponds to a dew point ranging from minus 100° C to minus 40° C for a sintering temperature of 1700° C. Thus, the disadvantages of the prior art include (1) inconsistency in the preferred range of the dew point in hydrogen (although wet hydrogen is known to us to be preferable) and (2) hydrogen gas is flammable, which requires sophisticated safety provisions.

In the case of the prior art in which dissociated ammonia or cracked ammonia was used and the dew point was not stated, it could contain 50 to 500 ppm residual $NH_3$, and have a dew point ranging from minus 100° C to plus 20° C. U.S. Pat. No. 3,792,142 contained a statement that ammonium decomposed gas was subjected to a drying step; however, this was not substantiated by any data or by the examples listed in the patent. No reason was given as to why the drying step was required. In fact, none of the examples in U.S. Pat. No. 3,792,142 utilized dissociated ammonia. The effect of water vapor content in dissociated ammonia apparently was never studied, although U.S. Pat. No. 4,373,030 stated that the partial pressure of oxygen in dissociated ammonia gas should be kept in the range of $10^{-15}$ to $10^{-25}$ atm, which was equivalent to a dew point range from about minus 116° C to minus 62° C for a sintering temperature of 1700° C, if water vapor was used to produce the desired oxygen partial pressure. The lower range (less than 110° C) of the dew point is not measurable on the state-of-the-art hygrometers. It is therefore logical to assume that the control of oxygen concentration stated in U.S. Pat. No. 4,373,030 involved some other trace gasses, such as CO or $CO_2$, rather than water vapor. Here again, the disadvantage of the prior art was that the dew point of dissociated ammonia was not specified. Moreover, dissociated ammonia is combustible and requires sophisticated safety provisions.

SUMMARY OF THE INVENTION

In accordance with one aspect of the present invention, a new and improved method for making a translucent polycrystalline alumina article comprises the following steps:

Step 1 - An alumina powder and a sintering aid are mixed in a liquid for a period sufficient to form a homogeneous slurry.

Step 2 - The homogeneous slurry from Step 1 is dried to remove the liquid to form a dried powder.

Step 3 - The dried powder is shaped to form a compacted green body.

Step 4 - The compacted green body from Step 3 is heated at a temperature equal to or less than 500° C and for a period sufficient to form a compacted green body having a density of at least 30% of theoretical density.

Step 5 - The compacted green body having a density of at least 30% of theoretical density from Step 4 is heated at a temperature from about 800° C to about 1300° C in an oxygen containing atmosphere for a period sufficient to impart green strength to said compacted green body to form a prefired compacted green body.

Step 6 - The prefired compacted green body from Step 5 is sintered at a temperature from about 1700° C to about 2000° C in a nitrogen/hydrogen atmosphere consisting essentially of nitrogen and hydrogen for a period sufficient to form a translucent polycrystalline alumina article, the hydrogen being equal to or greater than about one volume percent of said nitrogen/hydrogen atmosphere and having a dew point equal to or less than about minus 15° C.

DETAILED DESCRIPTION OF THE PREFERRED EMBODIMENTS

Translucent polycrystalline alumina bodies were prepared by the process of the present invention. The process of the present invention comprises sintering a prefired compacted green body of predetermined shape at a maximum sintering temperature in an atmosphere containing nitrogen and an amount of hydrogen greater than or equal to about one volume percent with a dew point equal to or less than minus 15° C for a period of time sufficient to produce a translucent polycrystalline alumina body, the green body consisting of alumina and one or more sintering aids. The dew point was measured at a point downstream from the hot zone of the furnace.

Maximum sintering temperatures typically fell within the range of about 1700° C to about 2000° C, with sintering time being from about 5 minutes to about 6 hours.

The use of sintering atmosphere containing nitrogen and an amount of hydrogen greater than or equal to about one volume percent with a dew point equal to or less than minus 15° C, preferably equal to or less than minus 25° C, and more preferably equal to or less than minus 40° C, creates a significant economic advantage as well as safety advantage over using pure hydrogen. Because hydrogen is an expensive gas, reducing the amount hydrogen in the sintering atmosphere to an amount greater than or equal to about one volume percent results in a substantial cost savings. Additionally, a reduction in the amount of hydrogen in the sintering atmosphere improves the overall safety of the process. This is especially true when the amount of hydrogen used is less than the explosive limit of 18 volume percent hydrogen.

In preparing the green body, a particulate homogeneous or at least substantially homogeneous dispersion of alumina powder and at least one sintering aid was formed. Examples of sintering aids include MgO, $Y_2O_3$, $La_2O_3$, $ZrO_2$, $HfO_2$, $Yb_2O_3$, and mixtures thereof. MgO is the most effective of these sintering aids. Alternatively, in the present process, if desired, an inorganic or organic precursor of the sintering aid can be used. The precursor should decompose to form the oxide and by-product gas or gasses before sintering proceeds to the closed pore stage. Representatives of the precursors of the sintering aids useful in the present process are the carbonates, hydroxides, nitrates, and stearates of magnesium, yttrium, lanthanum, zirconium, hafnium, and ytterbium.

In carrying out the present process, the alumina can be of commercial or technical grade. Specifically, it should not contain any impurities which would have a significantly deleterious effect on the desired optical transmission properties of the resulting sintered product. Preferably, the alumina powder used is at least about 99.96% pure. Most preferably, the alumina powder used is about 99.99% pure and contains about 65% by weight alpha-aluminum oxide and about 35% by weight gamma-alumina oxide.

The alumina and sintering aids, or the precursors for the sintering aids, can be admixed by a number of techniques, such as, using a propeller mixer for wet mixing to produce a significantly or substantially uniform or homogeneous dispersion or mixture. The more uniform the dispersion, the more uniform is the microstructure, and therefore, the properties of the resulting sintered body.

Mixing may be carried out with the charge suspended in a liquid medium in which the additives are dissolved. Typical liquids include water. Mixing time varies widely and depends largely on the amount and type of mixing equipment. In general, mixing time ranges from about one hour to about 200 hours. The mixed material can be dried by a number of conventional techniques to remove the liquid medium. Preferably, it is dried by spray drying.

In the present dispersion, the average crystallite size ranges from about 0.05 micron, i.e., a mean specific area of about 30 $m^2/g$, to less than one micron. An average crystallite size less than about 0.01 micron is not useful since it is generally difficult or impractical to compact the powder to densities of at least 30% of the theoretical. On the other hand, an average crystallite size of one micron or higher will produce a ceramic body with a final density lower than the theoretical density of sapphire.

A number of techniques can be used to shape the powder mixture, i.e., homogeneous dispersion, into a green body. For example, it can be extruded, injection molded, die-pressed, isostatically pressed, or slip cast to produce the green body of desired shape. Any lubricants, binders, or similar materials used in shaping the powder mixture should have no significant deteriorating effect on the resulting sintered body. Such materials are preferably of the type which evaporate on heating at relatively low temperature, preferably below 500° C, leaving no significant residue. The green body should have a density of at least 30%, and preferably 45% or higher, of the theoretical density of 3.986 g/cc for alumina, to promote densification during sintering and achieve attainment of theoretical density.

Preferably, before sintering, the green body or compact is prefired in an oxygen-containing atmosphere such as air at a temperature ranging from about 800° C to about 1300° C. Most preferably, the prefiring temperature is about 1200° C to eliminate impurities including shaping aids and water which would have a significantly deleterious effect on the optical translucency of the sintered body and to convert the sintering aid precursors to oxides. The particular prefiring temperature and period is determinable empirically and depends largely on the level of impurities present and on the thickness of the body, and generally ranges from about one to 5 hours. Such prefiring allows the sintering atmosphere to be free of impurities, and imparts sufficient strength to the compact, allowing it to be more easily handled and machined.

The alumina powder used in the examples of Tables I and II was a high-purity (99.99%), fine $Al_2O_3$ powder with an ultimate particle size of 0.05 micron and a specific surface area of 30 m²/g. The mean agglomerate size was less than 2 microns. The powder contained 65% alpha-$Al_2O_3$ and 35% gamma-$Al_2O_3$. Other types of high-purity, fine $Al_2O_3$ powders from commercial sources could be used.

Dopants were added by mixing the alumina in water solutions of $Mg(NO_3)_2$ alone, or $Mg(NO_3)_2$ plus $Y(NO_3)$, or $Mg(NO_3)_2$ plus $Zr(NO_3)_4$. The resulting slurry was spray dried. Green compacts in the form of tubes were made by cold isostatic pressing. The green tubes were prefired at 1200° C in air for 2 hours.

Table I lists the results of a study to measure the effect of atmosphere upon the sintering of polycrystalline alumina. Polycrystalline alumina tubes doped with the additive concentrations of 500 ppm MgO and 350 ppm $Y_2O_3$ were sintered in a tungsten-element, molybdenum-shield furnace under an atmosphere of flowing $N_2$—$H_2$ at various $H_2$ contents with a dew point of about minus 40° C to minus 60° C except for two cases noted. The gas flow rate through the furnace was about 5 liters per minute, corresponding to a linear gas velocity of about 2.6 meters per minute. The sintering temperatures were 1950° C reached by heating at a rate of 1.6° C/s.

TABLE I

Results of sintering alumina doped with 500 ppm MgO and 350 ppm $Y_2O_3$ under $N_2$—$H_2$ atmospheres.

| Gas | Dew Point | Transmittance (%) | |
|---|---|---|---|
| | | Total | In-line |
| $N_2$-8% $H_2$ | −40° C. to −60° C. | 96.3 ± 0.2 | 7.0 ± 0.2 |
| $N_2$-8% $H_2$ | 23° C. | 85.4 ± 1.5 | 0.5 ± 0.1 |
| $N_2$-8% $H_2$ | 0° C. | 88.5 ± 1.2 | 0.6 ± 0.1 |
| $N_2$-8% $H_2$ | −40° C. to −60° C. | 96.2 ± 0.4 | 6.0 ± 0.3 |
| $N_2$-4% $H_2$ | −40° C. to −60° C. | 95.5 ± 0.4 | 3.4 ± 0.9 |
| $N_2$-1% $H_2$ | −40° C. to −60° C. | 93.7 ± 0.6 | 1.2 ± 0.5 |
| $N_2$ | −40° C. to −60° C. | 86.4 ± 0.7 | 0.5 ± 0.3 |

The results of the experiments presented in Table I show that a high degree of translucency was obtained in polycrystalline alumina sintered at 1950° C for 30 minutes in a $N_2$—$H_2$ atmosphere containing as little as 1.0% $H_2$ by volume with a dew point of about minus 40° C to about minus 60° C. At lower $H_2$ concentrations, the transmittance drops off sharply.

TABLE II

Results of sintering of alumina doped with MgO and $Y_2O_3$ additives at 1950° C. for 30 minutes under $N_2$-8% $H_2$ containing various watering vapor concentrations.

| Transmittance(%) | | Water Vapor | Dew |
|---|---|---|---|
| Total | In-line | Content | Point (°C.) |
| 85.4 ± 1.5 | 0.5 ± 0.1 | 2.8% | 23 |
| 88.5 ± 1.2 | 0.6 ± 0.0 | 0.61 | 0 |
| 90.5 ± 1.3 | 0.7 ± 0.1 | 0.15% | −15.7 |
| 95.4 ± 1.0 | 3.7 ± 1.5 | 0.051% | −27 |
| 96.6 ± 0.4 | 5.1 ± 1.0 | 0.013% | −40 |
| 96.5 ± 0.6 | 6.6 ± 0.3 | 0.0011% | −60 |

Table II lists the results of polycrystalline alumina doped with MgO plus $Y_2O_3$, sintered in a tungsten-element, molybdenum-heat-shield furnace under $N_2$—8% $H_2$ of various dew points. The cross section of the furnace was 4 inches by 0.75 inches. The hot zone was 8 inches long. The flow rate of $N_2$—8% $H_2$ was 5 liters per minute giving a linear gas velocity of about 2.6 meters per minute. The sintering temperature was 1950° C, and the heating rate was approximately 1.6° C/s.

The use of wet (dew point greater than minus 15.7° C) $N_2$—8% $H_2$ resulted in opaque tubes. This is contrary to the case of bubbling pure $H_2$ through water which is commonly known to be beneficial to sintering of PCA to high transmittance. There was no evidence of oxidation of tungsten element of molybden shield when wet $N_2$—8% $H_2$ was used.

Table II shows that the transmittance increases with decreasing dew point or water vapor content in the sintering atmosphere. The critical water vapor content in $N_2$—8% $H_2$ for sintering of PCA to high transmittance is about 0.15% (dew point minus 15.7° C), above which the transmittance decreases.

The present invention solved the problem of (1) combustibility of flammability of hydrogen sintering atmosphere and (2) defining the preferred range of the dew point. The advantages of the present invention include:
Safety
Lower cost gas ($N_2$—$H_2$ vs. pure $H_2$)
High transmittance PCA achieved by controlling the dew point of $N_2$—$H_2$.

ALTERNATE METHODS AND EXTENSIONS OF INVENTION

Sintering of alumina in induction/microwave coupled plasma furnaces, or directly microwave-coupled environments.

The critical dew point of minus 15° C could shift a little, depending on the sintering temperature and the amount of $H_2$ in the $N_2$—$H_2$ atmosphere.

Examples in the text include alumina doped with MgO and $Y_2O_3$. However, other dopants such as MgO only, and MgO plus $ZrO_2$, etc. are also expected to work.

Other translucent alumina products such as orthodontic braces may use the sintering process reported in this disclosure.

While there has been shown and described what is at present considered the preferred embodiment of the invention, it will be obvious to those skilled in the art that various changes and modifications may be made therein without departing from the scope of the inventions as defined by the appended claims.

What is claimed is:

1. A method of making a translucent polycrystalline alumina article comprising the following steps:
    Step 1- mixing an alumina powder and a sintering aid in a liquid for a period sufficient tot form a homogeneous slurry;
    Step 2- drying said homogeneous slurry from Step 1 to remove said liquid to form a dried powder;
    Step 3- shaping said dried powder to form a compacted green body;
    Step 4- heating said compacted green body from Step 3 at a temperature equal to or less than 500° C and for a period sufficient to form a compacted green body having a density of at least 30% of theoretical density;
    Step 5- heating said compacted green body having a density of at least 30% of theoretical density from Step 4 at a temperature from about 800° C to about 1300° C in an oxygen containing atmosphere for a period sufficient to impart green strength to said compacted green body to form a prefired compacted green body; and
    Step 6- sintering said prefired compacted green body from Step 5 at a temperature from about 1700° C to about 2000° C in a nitrogen/hydrogen atmosphere consisting essentially of nitrogen and hydrogen for a period sufficient to form a translucent polycrystalline alumina article, said hydrogen being equal to or greater than about one volume percent up to eighteen volume percent of said nitrogen/ hydrogen atmosphere and having a dew point equal to or less than about minus 15° C.

2. A method in accordance with claim 1 wherein said sintering aid is selected from the group consisting of MgO, $Y_2O_3$, $ZrO_2$, $HfO_2$, $Yb_2O_3$, and mixtures thereof.

3. A method in accordance with claim 1 wherein said sintering aid is selected from the group consisting of an inorganic precursor of MgO, $Y_2O_3$, $ZrO_2$, $HfO_2$, $Yb_2O_3$, and mixtures thereof.

4. A method in accordance with claim 1 wherein said sintering aid is selected from the group consisting of an organic precursor of MgO, $Y_2O_3$, $ZrO_2$, $HfO_2$, $Yb_2O_3$, and mixtures thereof.

5. A method in accordance with claim 1 wherein said alumina powder is a least 99.96% pure.

6. A method in accordance with claim 1 wherein said alumina powder is a least 99.99% pure and contains about 65% by weight alpha-aluminum oxide and the remainder gamma-aluminum oxide.

7. A method in accordance with claim 1 wherein said mixing of Step 1 comprises mixing with a propeller mixer.

8. A method in accordance with claim 1 wherein said liquid of Step 1 comprises water.

9. A method in accordance with claim 1 wherein said mixing period in Step 1 is about one hour to about 200 hours.

10. A method in accordance with claim 1 wherein said drying in Step 2 comprises spray drying.

11. A method in accordance with claim 1 wherein said alumina comprises an alumina having a crystallite size ranging from about 0.05 microns up to but not including one micron.

12. A method in accordance with claim 1 wherein said shaping in Step 3 is selected from the group consisting of extruding, injection molding, die-pressing, isostatic-pressing, slip casting, and combinations thereof.

13. A method in accordance with claim 1 wherein said compacted green body of Step 4 has a density equal to or greater than 45% of theoretical density.

14. A method in accordance with claim 1 wherein said heating in Step 5 is at a temperature of about 1200° C.

15. A method in accordance with claim 1 wherein said period of heating in Step 5 is from about one to about five hours.

16. A method in accordance with claim 1 wherein said alumina in Step 1 has an ultimate particle size of about 0.05 microns, a specific surface area of 30 $m^2/g$, and mean agglomerate size less than 2 microns.

17. A method in accordance with claim 1 wherein said sintering aid is selected from the group consisting of $Mg(NO_3)_2$, $Mg(NO_3)_2$ and $Y(NO_3)_3$, or $Mg(NO_3)_2$ and $Zr(NO3)_4$.

18. A method in accordance with claim 1 wherein said dew point of said nitrogen/hydrogen atmosphere in Step 6 is equal to or less than about minus 25° C.

19. A method in accordance with claim 1 wherein said nitrogen/hydrogen atmosphere in Step 6 has a flow rate of about 5 liters per minute, corresponding to a linear gas velocity of about 2.6 meters per minute.

20. A method in accordance with claim 1 wherein said sintering in Step 6 is at a temperature of about 1950° C and a heating rate of about 1.6° C/sec.

* * * * *